April 23, 1957 G. C. BERGER 2,789,598
MACHINE FOR FABRICATING PIECES OF LUMBER
Original Filed Oct. 9, 1948 5 Sheets-Sheet 1
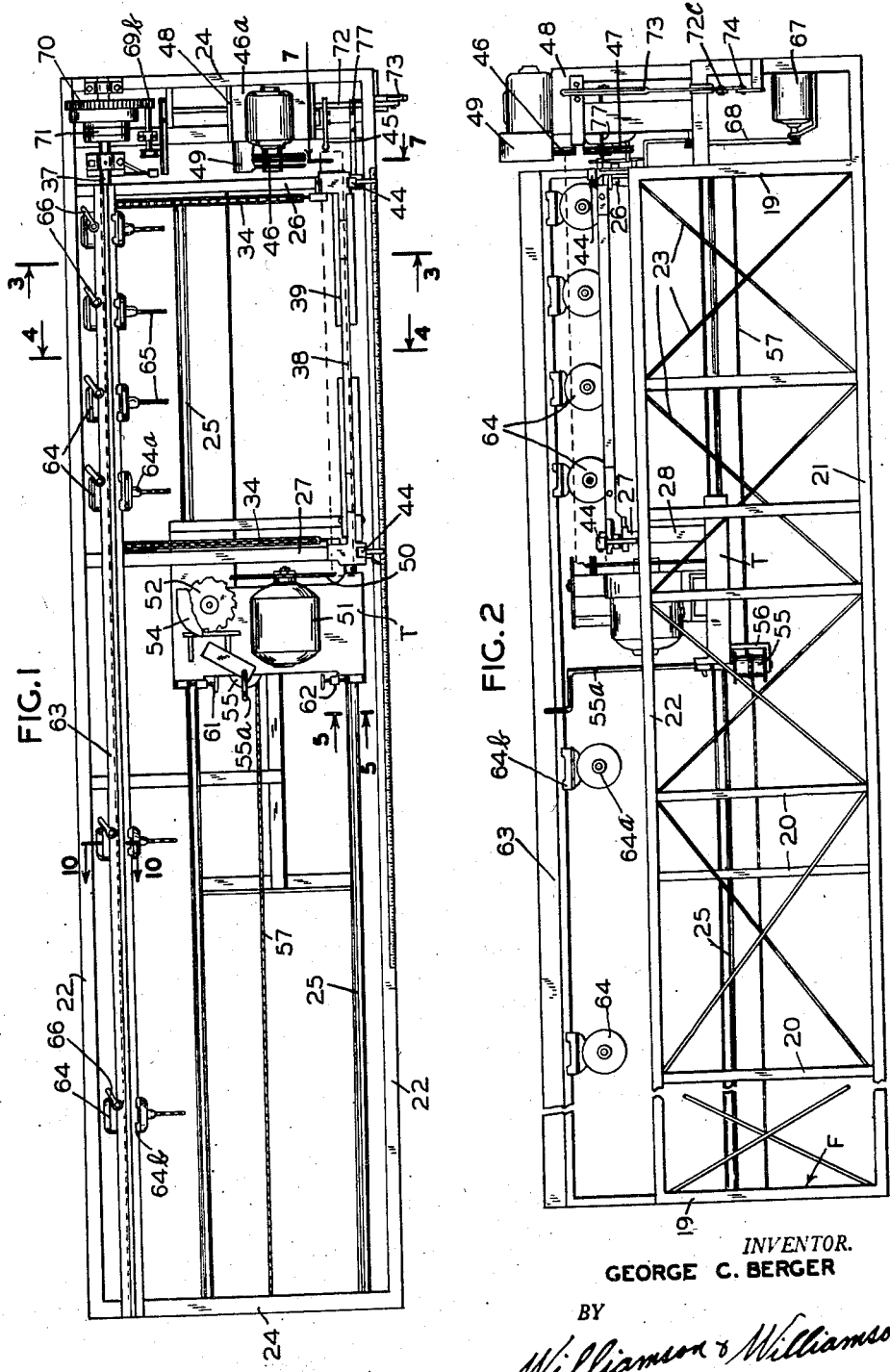
INVENTOR.
GEORGE C. BERGER
BY
Williamson & Williamson
ATTORNEYS

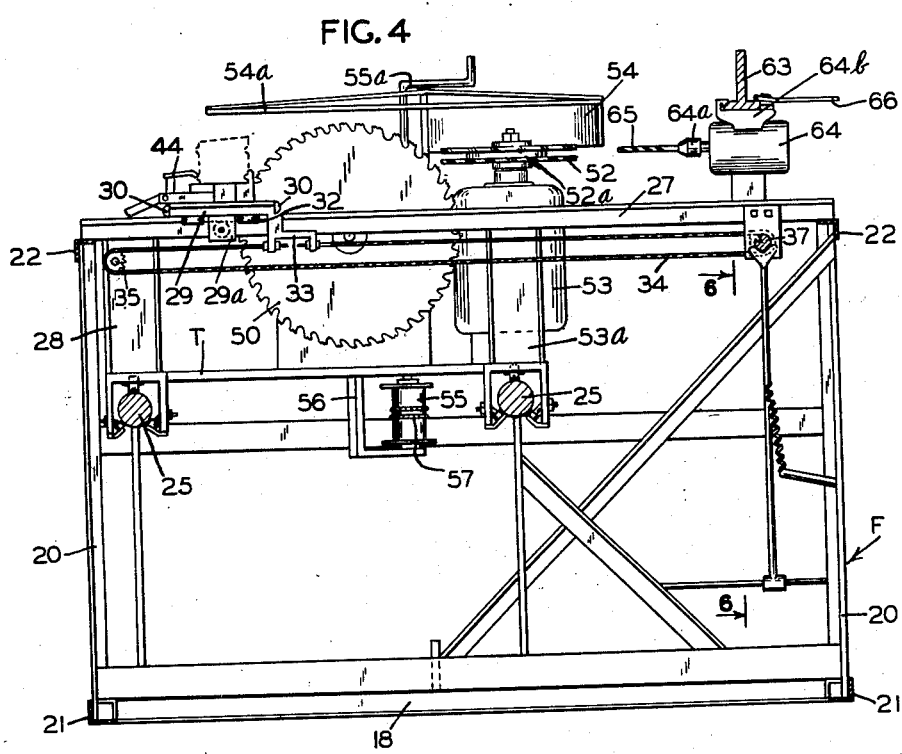
FIG. 4
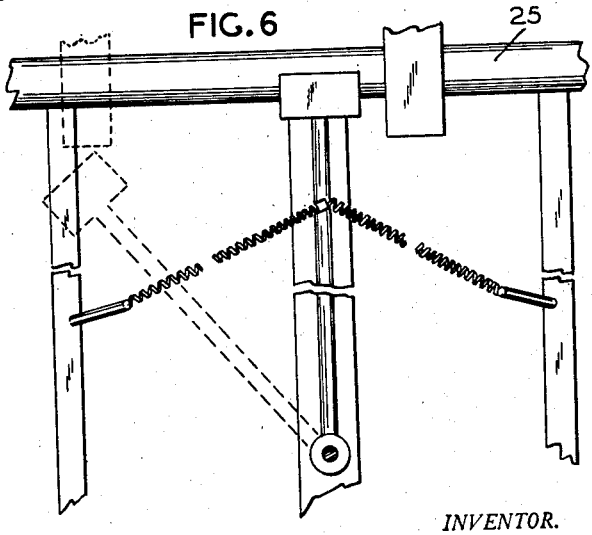
FIG. 5
FIG. 6
INVENTOR.
GEORGE C. BERGER

April 23, 1957 G. C. BERGER 2,789,598
MACHINE FOR FABRICATING PIECES OF LUMBER
Original Filed Oct. 9, 1948 5 Sheets-Sheet 2

INVENTOR.
GEORGE C. BERGER
BY
*Williamson & Williamson*
ATTORNEYS

April 23, 1957 G. C. BERGER 2,789,598
MACHINE FOR FABRICATING PIECES OF LUMBER
Original Filed Oct. 9, 1948 5 Sheets-Sheet 4
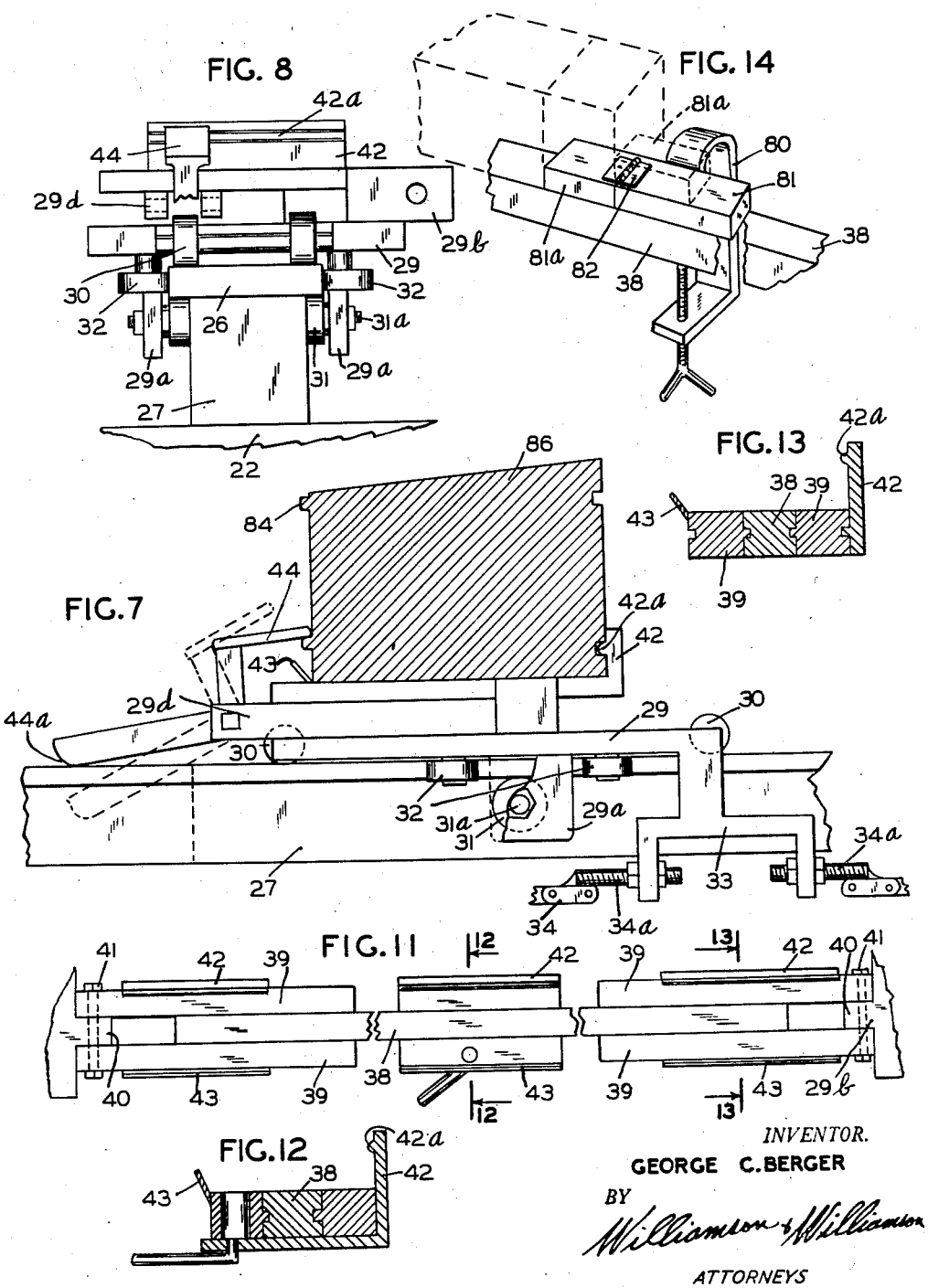
INVENTOR.
GEORGE C. BERGER
BY
Williamson & Williamson
ATTORNEYS April 23, 1957  G. C. BERGER  2,789,598
MACHINE FOR FABRICATING PIECES OF LUMBER
Original Filed Oct. 9, 1948  5 Sheets-Sheet 5

INVENTOR.
GEORGE C. BERGER
BY
Williamson & Williamson
ATTORNEYS

2,789,598

MACHINE FOR FABRICATING PIECES OF LUMBER

George C. Berger, Erskine, Minn.

Continuation of application Serial No. 53,734, October 9, 1948. This application September 14, 1953, Serial No. 380,033

2 Claims. (Cl. 144—35)

This invention relates to a machine for fabricating the ends of pieces of lumber and for drilling the intermediate portions thereof to prepare the lumber for rapid assembly and joining to form the walls of a building. While not restricted to, the machine is particularly adapted to prepare and fabricate lumber for assembly in prefabricated wall sections.

This application is a continuation of application, S. N. 53,734, filed October 9, 1948, and now abandoned.

It is an object of my invention to provide a comparatively simple, highly efficient unitary machine which in one operation of a work-holding carriage, will automatically and accurately size to length and fabricate in a timber or piece of lumber, mating ends for juncture with similar pieces.

More specifically, it is an object to provide a compact commercial machine of the class described employing an elongated longitudinally extensible piece-holding carriage mounted for linear transverse reciprocation and cooperatively associated with two sets of cutter tools for working upon the ends of a piece of lumber to fabricate in one end, an intermediately disposed mating groove and to fabricate substantially simultaneously in the other end, a complementarily shaped mating tongue, with adjustable power drill elements for drilling the piece at spaced points during a single reciprocation of the work carriage.

A further object is the provision of a power driven automatic machine of the class described wherein ready and simultaneous adjustment is obtained for cutting and grooving pieces of lumber varying within a great range of length and whereby the spaced relation of the drilling elements may be quickly varied within a wide range.

Still another object is the provision of a machine of the class described wherein a piece of lumber may simultaneously with other cutting operations be cut to length and the lengths materially varied as desired during subsequent operations of the machine, the piece of lumber in each case being held rigidly and positively through the entire operation for close tolerance cutting.

These and other objects and advantages of my invention will more fully appear from the following description made in connection with the accompanying drawings wherein like reference characters refer to similar parts throughout the several views and in which:

Fig. 1 is a top plan view of an embodiment of my lumber fabricating machine;

Fig. 2 is a front elevation of the same;

Fig. 4 is a vertical section taken on the line 4—4 of Figure 1 looking in the direction of the arrows and showing the saw and cutter mechanism for operating upon the left hand end of a piece of lumber and the adjustable mounting of such mechanism upon a horizontal table or carriage;

Fig. 5 is a detail section taken on the line 5—5 of Fig. 1, looking in the direction of the arrows, showing the clamping mechanism for retaining the adjustable tool-supporting table in any one of an infinite number of adjusted positions;

Fig. 6 is a detail, vertical section taken on the line 6—6 of Fig. 4 showing a shiftable track-supporting element associated with the support for the adjustable mounting table;

Fig. 7 is a detail, vertical section taken on the line 7—7 of Fig. 1 looking in the direction of the arrows and showing the right hand end of the work-holding carriage and the piece-retaining mechanism associated therewith;

Fig. 8 is a front end elevation showing one of the rolling supports for the work-holding carriage;

Fig. 11 (Sheet 4) is a fragmentary top plan view showing the longitudinally extensible work-holding carriage;

Fig. 12 is a cross section taken on the line 12—12 of Fig. 11 showing a holding clamp on said work carriage for engaging a piece of lumber;

Fig. 13 is a cross section taken on the line 13—13 of Fig. 11;

Fig. 14 is a detail, perspective view showing an adjustable stop or abutment block adapted to be applied to the central supporting bar of the work holder for facilitating certain fabrications on short pieces such as the forming or corner mating structure in the ends;

Figure 15:
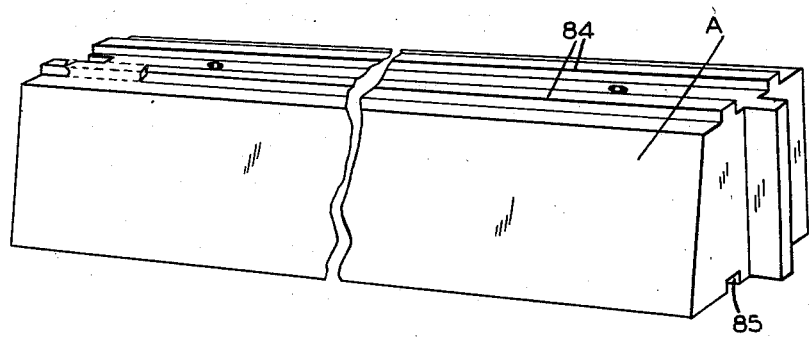
Figure 16:
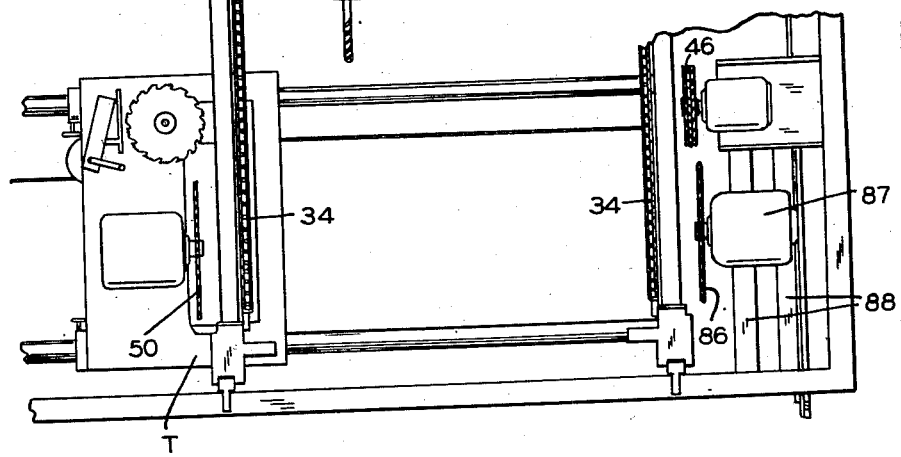
Figure 17:
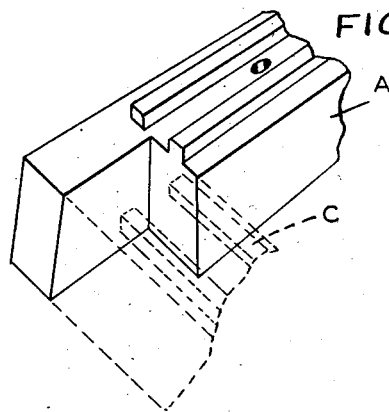

Fig. 15 is a fragmentary perspective view showing a piece of lumber which has been fabricated by my machine after a preliminary planing operation forming longitudinal ribs and grooves in the top and bottom sides thereof; and Fig. 16 is a fragmentary plan view showing a somewhat different embodiment of my invention wherein the rotary cutter tools at the right hand end of the machine are arranged differently than in the form first described and wherein the rotary saw is also employed at the right hand end of the machine to square the piece and cut the right hand end for length; and Fig. 17 is a fragmentary perspective view showing a suitable form of corner construction which may be fabricated on my machine.

Referring now to the embodiment of my machine illustrated in Figs. 1 to 14 inclusive, I provide an elongated, upstanding, rectangular frame, indicated as an entirety by the letter F and constructed for the most part of metal angle bars with horizontal transverse bars 18 at the base, spaced apart throughout the length of the frame and with upstanding angle bars 19 welded or otherwise rigidly secured to bars 18 and extending at the ends of the machine and with a plurality of shorter angle bars 20 spaced apart as shown in Fig. 2, at the front and rear sides of the machine, in connecting longitudinal base bars 21 with upper longitudinal bars 22.

The frame is suitably braced by horizontal angle beams and by supporting rails for the work-holding carriage (later to be described) and also by several series of crossed brace rods 23 disposed at the front and rear sides of the machine.

At the top of the frame, transverse angle beams 24 are welded or otherwise rigidly secured to the corner posts of the frame and interconnect the upper longitudinal bars 22.

In the embodiment illustrated, power transmission mechanism and cooperating cutter mechanism are mounted in stationary relation at the right hand end of the machine while automatic tools for operating upon the left hand end of a piece of lumber are supported upon a heavy adjustment table T slidably mounted for adjustment longitudinally of the machine, upon a pair of longitudinally disposed shaft tracks 25 which are supported in horizontal, parallel relationship at an intermediate height on frame F.

I provide an elongated, longitudinally extensible workholding carriage which extends longitudinally of the machine and is reciprocated preferably by power means through a linear path transversely of the frame. This carriage is supported upon a pair of parallel transverse T rails 26 and 27, one of which, 26, is supported from and secured to the right end of the frame structure and the other of which, 27, is supported at its ends from suitable upstanding bolsters 28 fixed at their lower ends to the top of the adjustable tool mounting table T. The tops of tracks 27 and 26 are disposed in a horizontal plane a short distance above the top members 22 of the main frame. Suitable wheel and guide roller mechanism is applied to each of the tracks 26 and 27 to support the respective ends of the work carriage platform and facilitates horizontal reciprocation of such carriage. The wheel and guide roller mechanism illustrated in Figs. 3, 4, 7 and 8 comprises a generally rectangular mounting plate 29, having journaled between the bifurcated ends thereof, two sets of supporting wheels 30 which rest upon the horizontal top surface of the respective track 26 or 27. Each of the mounting plates 29 intermediately of their side edges, which are disposed transversely of the machine frame, are provided with a pair of depending lugs 29a spaced outwardly a short distance beyond the side edges of the track and having journaled therein, by stub shafts 31a, underlying guide rollers 31 which engage against the flanges of the T rail or track. Two sets or pairs of side rollers 32 are journaled on depending vertical stub shafts secured to the bottom of plate 29 and engage the respective side edges of the track 26 to prevent lateral displacement of the mounting plate 29 during its travel. At the rear end of each of the mounting plates 29 of my carriage, I attach a depending actuating yoke 33 extending in close spaced relation to one of the longitudinal edges of the track and having its bifurcated extremities connected by adjustment screws 34a with a propelling chain 34. The propelling chain 34 for each wheel and guide roller mechanism of the carriage, is trained about a pair of sprockets 35 and 36, sprocket 35 being journaled at the front of the machine and as shown, being an idler while sprocket 36 is fixed to a driven shaft 37 at the rear of the machine. Between the two sets of supporting wheel and guide roller mechanisms and longitudinally extensible or contractible with the adjustment of the tool mounting table, I provide a work or piece-supporting platform, as shown in Figs. 1, 11, 12 and 13, comprising a central rigid bar 38, longitudinally grooved at its side portions for slidably interfitting (for portions of its length from the ends thereof inwardly) two sets of spaced parallel rigid bars 39. Each pair or set of bars 39 are rigidly interconnected in predetermined, spaced relation by a spacer block 40 and the outer ends of bars 39 extend a short distance beyond said spacer block to afford pintles for hinged connection by a pin 41, with a horizontal lug 29b fixed to the mounting plate 29. The top surfaces of the bars 38 and 39 of my carriage platform, lie in a common horizontal surface and serve to support the piece or pieces of lumber to be fabricated. I provide means on my carriage to retain and clamp the piece or pieces of work to be fabricated. The specific means disclosed, is particularly applicable to lumber constructed substantially in accordance with the teaching of my Patent No. 2,112,861, granted April 5, 1938, as shown in Figs. 7 and 15 of the drawings. This lumber is formed in a planer which leaves the outer side thereof beveled with respect to the rear, vertical side and has formed on the top thereof, a pair of widely spaced longitudinal ribs while at the bottom of the piece, a pair of complementary grooves are formed therein, for receiving the upstanding ribs of the similar piece below. My piece-retaining mechanism, as shown, includes a rigid abutment flange 42 upstanding from the rear members 39 of the carriage platform and extending longitudinally thereof for abutting the rear edge of the piece of lumber when it is turned on its side for fabricating in my machine, as shown in Fig. 7. The abutment flanges 42 have, in the form shown, interlocking ribs 42a which are adapted to interfit the longitudinal lower groove on the piece of lumber carried.

On the rear longitudinal edges of the rear bars 39 of the carriage platform, inclined, upstanding abutment flanges 43 are provided extending longitudinally through the greater parts of the lengths of bars 39. In addition to the abutment flanges 42 and 43 for retaining the work pieces on the carriage, I provide a clamping dog (see Fig. 7) adapted to engage the rear edge of the workpiece when swung upwardly, and with the particular lumber referred to, adapted to interlock above the lower longitudinal rib on that piece. Clamping dog 44 has an offset camming arm 44a which is pivoted at the intermediate portion of the dog to a lug 29d, attached to the rear of the appropriate carriage mounting plate 29. Camming arm 44a upon operation of the carriage, rides upon the top of one of the carriage tracks and is maintained thereby in full line, raised position, as shown in Fig. 7, causing the tooth of the dog to engage the piece of lumber, as shown and to retain the same in cooperation with the abutment flange 42. With my work-holding carriage as described, a piece or two or more pieces of lumber are moved laterally and horizontally across the top of machine frame and are then reciprocated in linear horizontal movement to the initial or starting position at the front side of the machine.

As shown in Fig. 1, an end abutment or guide element 45 is secured to the right hand end of the frame at the top, having a rounded exterior for engaging the right hand end of a piece of lumber mounted in the carriage. The right hand end of the lumber is fabricated in its lateral horizontal travel, by a cooperating pair of cutter heads or dadoes 46 and 47, spaced apart and disposed at top and (Fig. 3) bottom portions of the path of the work mounted on the reciprocating carriage. As shown, the cutter mechanisms comprise an independent electric motor in each instance, the bases of said motors being adjustably mounted upon platform supports 46a and 47a respectively, which are affixed in inclined relations to an upstanding, rigid frame 48 mounted at the right hand end of the machine frame some distance inwardly from the front of the machine. The upper cutter mechanism 46 has its base secured to the platform 46a declined from front to rear from the horizontal while the lower cutter mechanism 47 has its base adjustably mounted on the platform 47a inclined from front to rear from the horizontal. By adjusting the positioning of the motor bases on platforms 46a and 47a, the spaced relation between the peripheries of the dado heads may be varied within limits. It will further be noted as indicated by the directional arrows, that the dado heads 46 and 47 are rotated in opposite directions and in directions which will cause the work to be fed therebetween through the rotative forces applied. The upper dado head 46, as shown, is housed at its upper portion within a guard housing 49 supported from the top of frame 48.

Tools for fabricating the left hand end of a piece of lumber are mounted upon the adjustable supporting table T (see Figs. 1 and 4). As shown, a disc saw 50, detachably affixed to the armature shaft of an electric motor 51, is suitably mounted on the forward portion of table T through the motor base, said saw being disposed in a plane perpendicular to the longitudinal edges of the workholding carriage and the board or boards affixed thereto. Rearwardly of the saw 50, a grooving dado head 52 is disposed in horizontal position affixed to the vertical armature shaft of an electric motor 53 which has an end base 53a secured to the top of table T at the rear portion thereof. The horizontal position of dado head 52 may be adjusted by spacer collars 52a disposed therebeneath. The dado head is disposed in the path of travel of the left end of a piece of lumber to be fabricated and is of a cutting width to groove said end of the piece or pieces to a width of slightly greater than the width of the tongue formed by a fabrication of the right hand end of the piece through dado heads 46 and 47. A shallow cylindrical guard housing 54 covers the top of dado head 52 and has extending forwardly therefrom, a guard rail 54a which overlies the upper edge of disc saw 50.

The support table T which is slidably mounted on the heavy horizontal rails 25, may be mechanically adjusted longitudinally of the machine by suitable means such as the steering wheel windlass comprising a vertical drum 55 journaled between the lower arm of an L lug 56 and the lower side of platform T and upon which is wound at least two convolutions of a flexible cable 57, the ends of which are secured to the right and left hand ends of the machine frame. An upstanding crank handle 55a is affixed to the drum for convenient manipulation by the operator to apply torque to the drum and thus adjust the table T longitudinally on its supporting rods 25. Clamping means are provided for rigidly fixing the table in an adjusted position. As shown (see Figs. 1 and 5), such clamping means comprise a pair of pivoted clamping elements 58 and 59 respectively, pivoted on horizontal bolts 60 disposed longitudinally of the frame and having arcuate jaws 58a and 59a, which engage and bite against portions of one of the rods or tracks 25. The clamping element 59 is provided with an inturned upper end 59b which is abutted by a horizontal screw 61 threaded in the upper end of a lug 62 having a wheel handle 61a for facilitating turning thereof. As shown, a pair of said clamping mechanisms are utilized, one adjacent each of the longitudinal edges of the platform. It will be noted that lengthwise adjustment of table T does not disturb the independent adjustment of the individual tools mounted thereon. It is therefore possible to maintain or preserve the general adjustment of the cooperating tools to a predetermined setting of the apparatus while quickly permitting adjustment for different lengths of lumber.

My machine is provided at the rear with a plurality of spaced power drills, adjustably supported from an inverted T track 63 which extends longitudinally of the frame at the rear thereof. As shown, each of the drills comprises a horizontally disposed motor 64 having a forwardly extending chuck 64a secured to the forward end of the armature shaft thereof in which the drill element 65 is detachably secured. The drill elements 65 of the several power drills are disposed in parallel horizontal relation, perpendicular to the work-carriage and the longitudinal edges of the piece or pieces to be fabricated. The motor 65 of each of the power drills, in the form shown, is provided at its top with a slide bracket 64b adapted to embrace the lower horizontal flanges of the rail 63 and a clamp handle 66 screw threaded at its inner clamping end connected with an upstanding screw 64c at the top of the motor, said inner end overlying the rear flange of rail 63 for clamping effect thereon. The drill elements 65 are positioned medially in the path of pieces to be fabricated and are of a length to completely drill a piece of lumber during the reciprocation of the work-carriage.

As has been previously stated, the longitudinally adjustable work-holding carriage is propelled in its rectilinear travel by the endless propelling chains 34 trained over idler pulleys 35 mounted adjacent the front of the frame and over driving pulleys 36 mounted at the rear of the frame and connected with the elongated driving shaft 37 which is suitably journaled and extends the full length of the frame at the rear thereof. Suitable means are provided for driving the elongated shaft 37 which as shown (see Figs. 1 and 3) comprises a motor 67 supported at the lower portion of the frame and adjacent the right hand end which drives, by endless V-belt 68, a pulley 69 affixed to a stub shaft 69a which carries at its right end, a small pinion 69b meshed with a large gear 70 which is connected for driving through a clutch mechanism 71 with the elongated driven shaft 37. The driving sprocket 36 for propelling the carriage mechanism on cross rail 27 mounted on the adjustable tool-supporting table T is keyed to shaft 37 for slidable adjustment thereon with, nevertheless, driving connection therewith.

Figure 3:
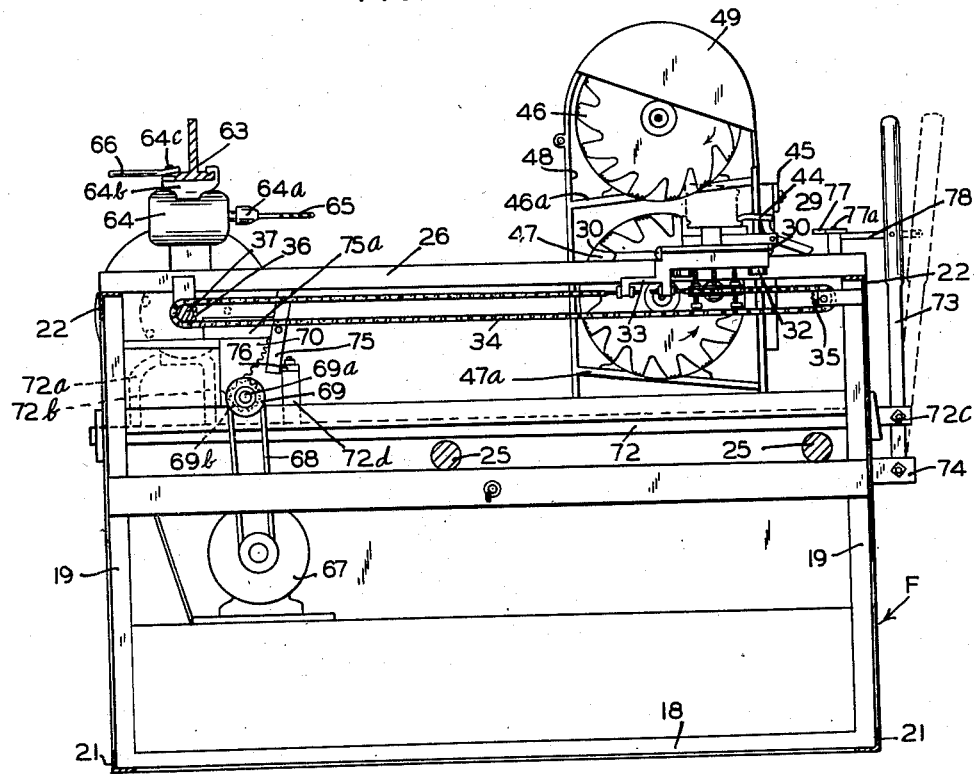
Fig. 3 is a vertical section taken along the line 3—3 of Fig. 1 showing the cutter mechanism for operating upon the right hand end of a piece and the driving means for the work-holding carriage.
Figure 9:
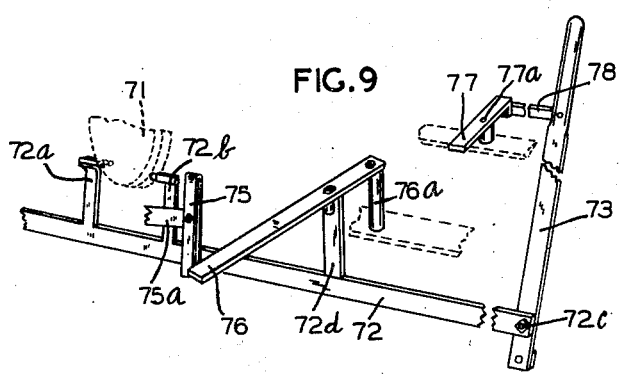
Fig. 9 (Sheet 2) is a diagrammatic perspective view illustrating the control mechanism for operation or reciprocation of the work-holding carriage.
Figure 10:
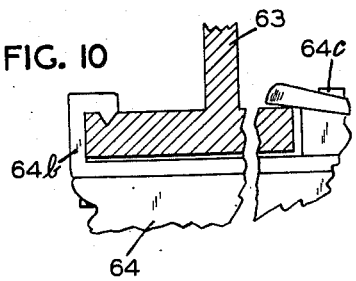
Fig. 10 is a detail, vertical section taken along the line 10—10 of Fig. 1 showing the clamping mechanism for securing one of the drill units in a desired adjusted position.

The clutch mechanism 71 is of the general type used in the T-model automobile formerly manufactured by Ford Motor Company, consisting in a reversing gear drum as well as a forward gear drum operatively connected with the driven large gear 70 through conventional transmissions. A clutch band (not shown) is mounted in each of the clutch drums of the mechanism 71 and when one band is tightened, shaft 37 is connected for forward driving while when the other band is tightened and the first released, the shaft 37 is driven in the opposite direction for retracting the work-holding carriage. In Fig. 9, mechanism for controlling the direct and reverse driving of shaft 37 is diagrammatically illustrated. Clutch mechanism 71 is shown in dotted lines with an operating arm 72a connected with the reversing clutch band for tightening and a second arm 72b connected with the forward driving clutch band for tightening. Arms 72a and 72b are fixed to a shift link 72 which is slidably mounted at the right hand side of the frame in a suitable mounting and which extends horizontally, transversely of the frame. The forward end of link 72 is connected by a bolt 72c with an intermediate point on an upstanding hand lever 73 which is fulcrumed at its lower end by a bolt to a lug 74. When hand lever 73 is pushed inwardly towards the front of the frame, transverse control link 72 is similarly shifted, tightening the clutch band connected with arm 72b and causing the driving shaft 37 to be revolved in counter-clockwise direction as viewed in Fig. 3 to move the work-holding carriage with a piece of lumber thereon, inwardly, for the fabricating steps. When the work-holding carriage moves to approximate extreme inward position, it abuts a short lever arm 75 pivotally mounted on a fixed lug 75a supported by the frame, such abutment swinging the lower end of lever arm 75 in the opposite direction, which in turn, abuts and rearwardly shifts a horizontal lever arm 76, which is fulcrumed at its right end on a vertical pin 76a and which is intermediately connected with an upstanding rigid arm 72d fixed to the shiftable control link 72. Through such connections, the control link 72 is shifted to extreme outward position releasing the clutch band connected with the upstanding control arm 72b and tightening the clutch band connected with the rearmost, upstanding arm 72a. In the retracting or forward travel of the work carriage, means are provided for returning shiftable control link 72 and lever 73 to normal position to disconnect power from shaft 37. As shown, said means (see Figs. 9, 1 and 3) comprises a horizontally disposed short lever arm 77 with its left end mounted in the path of the right end of the carriage to contact the same in its extreme outward travel and with its fulcrum 77a at the central portion of the arm and with its right hand or outer end connected by a link 78 with lever 73 to pull said lever forwardly slightly to neutral position.

In Fig. 17, a suitable corner construction for the ends of pieces of lumber of my invention, is illustrated.

Fig. 14, I illustrate a special abutment attachment for association with my work carriage to enable the machine to be utilized for forming such corner construction. In this connection, it will be seen (Fig. 17) that the end of a piece of lumber for one wall, as indicated by the dotted lines, member C, does not extend to the front surface of the abutting wall disposed at right angles thereto, member A. Therefore, in cutting corner mating recesses and tongues in the corner ends of pieces of lumber, alternate pieces will be cut shorter than the other pieces. In Fig. 14, I illustrate an end abutment attachment comprising a U-clamp 80 which is adapted to work in conjunction with central member 38 of the work carriage, and which adjustably retains an abutment block 81 in horizontal relation upon the top of member 38. The left hand end of abutment block 81, as shown, constitutes an abutment for engaging the end of a piece of lumber in such position that the opposite end of that piece may be cut or milled by the dado head 52 to produce the recess or rabbet shown in Fig. 17. An auxiliary and short abutment block 81a is hingedly connected with abutment block 81, as shown by a hinge 82 having its pintle or axis disposed just rearwardly of the abutment edge of the block 81. The hinge construction is such that block 81a may be swung downwardly flush against the top face of the horizontal beam 38 whereby the left hand edge of block 81a constitutes the abutment, or block 81a may be swung upwardly and backwardly against the top of the main abutment block 81 to enable the left hand edge of block 81 to constitute the abutment element for one end of a piece of lumber.

*Operation*

In use, the machine is first set by adjustment of the individual cutters 46 and 47 at the fixed end of the apparatus and of the cutter 52 with respect to saw 50 on table T. The entire tool-supporting table T is then adjusted longitudinally to cut and fabricate pieces of lumber at the desired length or lengths and the drill units 64 are adjusted and set upon their supporting horizontal track 63 for spacing of the drill elements 65 as desired. One or more pieces of lumber (depending upon the width of the work carriage) are then applied between the flanges 42 and 43 of the work carriage and the clutch mechanism for driving the carriage is engaged by manually swinging the lever 73 forwardly. The work carriage is then propelled towards the rear of the machine by chains 34 driven from the shaft 37, causing the right hand end or ends of the pieces to be pressed by the rotary cutters or dado heads 46 and 47, it being understood that in the machine illustrated in Figs. 1 to 14, one end of the piece or pieces has been cut and squared and is placed in abutment against the stop or abutment 45 at the right hand end of the machine. As the work carriage moves rearwardly, the left hand end of the piece or pieces carried are first cut to length by their disc saw 50 and immediately thereafter, milled by the dado head 52 to form central grooves or channels of very slightly greater width than the tongues formed by the two cooperating dado heads 46 and 47. The piece or pieces on the work carriage in the rearward movement of the carriage, are engaged and bored by the drill elements 65, automatically forming holes in the pieces at the desired spaced points therein. As the work carriage approaches extreme rearward or inward position, the upper arm of the upstanding lever 75 is engaged, causing its lower arm, below the fulcrum 75a to swing forwardly against the horizontal trip lever 76, which is pivoted at its right hand end upon the frame. The rear movement of trip lever 76 retracts the clutch control link 72 releasing the clutch mechanism 71 previously engaged and simultaneously engaging the reverse clutch mechanism which causes propelling chains 34 to be driven in reverse direction. The carriage then is driven forwardly towards the front of the machine, returning the fabricated pieces to starting position. As the work carriage approaches extreme forward position, the carriage engages the left end of the horizontal lever 77 at the right hand end of the machine, causing the opposite or right hand arm of that lever to be moved rearwardly and through link 78, to pull the manual control lever 73 forwardly a slight distance, into neutral position, thereby preventing damage to the work holding carriage in the event of carelessness on the part of the operator.

Attention is called to the efficient means for additionally clamping the lumber or piece rigidly upon the work carriage during operation, which includes the cam-operated dog 44 thrust into abutment with the rear upstanding edge of the piece through cam action of the end 44a with the top surface of the track 27.

While my machine is in no way limited in its use to the end fabrication and drilling of pieces of lumber of the design shown in Fig. 15, it is particularly adapted for fabrication of such pieces or members A which have previously been processed in a planing machine to provide at the upper edges thereof, longitudinal ribs 84 which are adapted to be seated in corresponding grooves 85 formed in the bottom of the piece of lumber to be applied thereabove. Such pieces of lumber A, which when fabricated in my improved machine, are disposed on their sides in the work carriage, as shown in Fig. 7, with the inclined or siding surfaces 86 thereof, disposed uppermost and with the ribs 84 disposed forwardly towards the front of my machine.

It will be readily understood that the tool-supporting table T may be adjusted within a wide range for fabricating pieces of lumber of various lengths. Such adjustment is effected through release of the clamping screws 61 and manipulation of the crank handle 55a which operates the steering wheel windlass.

It will further be understood that the spaced relation of the several drill motors 64 may be varied within a wide range, as desired, for the production of holes of lumber to be fabricated.

It will further be noted that slidable adjustment of the tool-supporting carriage T upon its rails 25, automatically adjusts the length of the work-holding carriage through sliding relation between the outer bars 39 and the central bar 38.

With my machine, pieces of lumber may be very quickly and accurately fabricated at the ends thereof, to form in one end of each board, a tongue or tenon and to simultaneously form in the opposite end thereof, a mating groove while during the latter portion of the inward operation of the work-holding carriage, the board is drilled in a predetermined number of points to provide spaced apertures in the desired relation.

It will further be seen that when corner pieces are required for juncture in two opposing walls, with my abutment mechanism shown in Fig. 14, a piece of lumber may be held in proper relation with adjustment of the tool-supporting table T to fabricate corner joining ends of slightly different lengths, as required.

In Fig. 16, a plan view of a slightly different embodiment of my invention is illustrated, which is preferred where lumber is employed which has not been previously cut at one end or mitered at 90 degrees to the length thereof. The corresponding parts of the machine in Fig. 16 are numbered similarly to those illustrated in the form first described, which is illustrated in Figs. 1 to 14 inclusive. In Fig. 16, the abutment element or roller 45 at the right hand end of the machine, is dispensed with and in place thereof, a disc saw 86 is employed in vertical relation, fixed as shown, to the end of the armature shaft of a motor 87, which is adjustably supported upon transverse bars 88 fixed to the right hand portion of the machine frame and adjacent the top thereof. Saw 86 is positioned with relation to the upper dado head 46 to accurately cut the right hand end of a board at right angles to the longitudinal edges thereof and along a line which is positioned with reference to the dado head 46 so that the upper and lower surfaces of the cut piece of lumber may be fabricated to leave a central tenon at the right hand end of the pieces treated. At the same time that the right hand end of the piece or pieces of lumber are cut by saw 86, the left hand ends of said pieces are cut to length by the saw 50 mounted on the tool-supporting table T.

It will, of course, be understood that various changes may be made in the form, details, arrangement and proportions of the parts without departing from the scope of my invention.

What I claim is:

1. A machine for forming consecutively a plurality of completed, interlocked construction units of predetermined structure comprising in combination, a supporting frame, guide means formed on said supporting frame, an elongated extensible piece-holding carriage mounted for lateral reciprocation in said guide means in a single plane transversely of said frame and having abutment and clamping means adapted during forward and rearward reciprocation thereof to firmly support pieces of lumber of varying lengths medially of the ends thereof, cutter mechanism mounted adjacent one end of the supporting frame and positioned in the projected pathway of one end of a piece of lumber disposed rigidly in said piece-holding carriage to operate upon said end in the guided travel of the carriage, a tool-supporting member mounted for longitudinal adjustment on said supporting frame, said tool-supporting member having powered tool means mounted thereon and positioned in the projected pathway of the other end of said piece of lumber in the forward guided movement of said carriage to cut said piece of lumber in predetermined dimension, and power drill means mounted medially of the respective cutter mechanism and tool means and aligned with the projected pathway of said piece of lumber and adapted to intercept the same during the forward travel of the piece-holding carriage, whereby said extensible piece-holding carriage, irrespective of the selected length of the piece of lumber, will maintain the piece of lumber in firmly supported relation along its length during a single reciprocating pass of the carriage for cutting the ends of the piece of lumber and for bearing drilling relation against the power drill means at the end of each pass.

2. A machine for forming consecutively from pieces of lumber a plurality of completed, interlocked construction units of predetermined structure comprising in combination, a supporting frame, a first guide track fixed transversely of the length of said supporting frame, a tool-supporting table mounted on said frame and adjustable longitudinally thereon, rotary tool cutting means supported on said table and adjustable therewith, a second guide track secured to said table and in parallel relation with said first mentioned fixed guide track, an elongated extensible piece-holding carriage mounted across said guide tracks for lateral reciprocation in a single plane transversely of said frame, said extensible piece-holding carriage having abutment and clamping means adapted to firmly support pieces of lumber of varying lengths medially of the ends thereof, cutter mechanism mounted on the supporting frame adjacent the fixed first guide track and positioned in the projected pathway of one end of such a firmly supported piece of lumber during guided travel of the carriage, said rotary tool-cutting means on said tool-supporting table being positioned in the projected pathway of the other end of the piece of lumber for operating thereon in the same guided travel of the carriage, said extensible piece-holding carriage, irrespectvie of the selected length of the piece of lumber, maintaining the same in firmly clamped relation for simultaneous and reproducible cuts at each end of each piece of lumber.

References Cited in the file of this patent

UNITED STATES PATENTS

| | | |
|---|---|---|
| 395,526 | Totman | Jan. 1, 1889 |
| 396,763 | Penfield | Jan. 29, 1889 |
| 554,152 | Southard | Feb. 4, 1896 |
| 560,234 | Rockwell | May 19, 1896 |
| 796,095 | Wattie | Apr. 1, 1905 |
| 1,461,919 | La Malta | July 17, 1923 |
| 1,464,020 | Anderson et al. | Aug. 7, 1923 |
| 1,756,296 | Madsen | Apr. 29, 1930 |
| 1,761,096 | Tower | June 3, 1930 |
| 1,765,987 | Marion | June 24, 1930 |
| 1,968,091 | Nash | July 31, 1934 |
| 2,510,820 | Hermanson | June 6, 1950 |

FOREIGN PATENTS

| | | |
|---|---|---|
| 147,875 | Switzerland | Sept. 1, 1931 |